United States Patent [19]

Langshaw

[11] Patent Number: 4,830,347
[45] Date of Patent: May 16, 1989

[54] ASSEMBLY FOR AND A METHOD OF ABSORBING IMPACT SHOCK LOADS

[75] Inventor: Bernard Langshaw, Leicester, England

[73] Assignee: Marathon Oil Company, Findlay, Ohio

[21] Appl. No.: 497,318

[22] Filed: May 23, 1983

[51] Int. Cl.$^4$ .............................................. F16M 1/00
[52] U.S. Cl. .......................................... 267/141; 52/98; 52/99; 52/232; 188/371; 188/376; 188/377; 248/548; 248/562; 267/141.1
[58] Field of Search ................... 188/371-377; 248/562, 561, 560, 566, 619-621, 634, 637, 638, 678, 548, 633; 108/51.1, 51.3, 901, 136, 902, 56.1; 267/63 A, 63 R, 140.1, 140.4, 140.3, 141, 141.1, 153, 152, 151, 158-165, 8, 9; 293/133, 136; 405/211, 216; 52/167; 29/428

[56] References Cited

U.S. PATENT DOCUMENTS

| | | | |
|---|---|---|---|
| 2,655,005 | 10/1953 | Kinneman | 267/141.1 X |
| 2,727,382 | 12/1955 | Kurz | 52/98 |
| 2,758,832 | 8/1956 | Hickman | 267/63 A |
| 2,870,871 | 1/1959 | Stevinson | 188/377 |
| 3,020,540 | 11/1961 | Dahlen | 52/98 X |
| 3,082,846 | 3/1963 | Jensen et al. | 188/377 |
| 3,107,377 | 10/1963 | Nathan | 14/16 |
| 3,114,940 | 12/1963 | Rockabrand et al. | 267/153 |
| 3,191,896 | 6/1965 | Nathan | 267/153 X |
| 3,311,331 | 3/1967 | Steimen | 248/22 |
| 3,345,245 | 10/1967 | Hanusa | 161/119 |
| 3,361,092 | 1/1968 | Budd | 108/51.1 |
| 3,362,666 | 1/1968 | O'Donnell | 248/22 |
| 3,430,923 | 3/1969 | Giavotto et al. | 188/377 X |
| 3,467,353 | 9/1969 | Peterson et al. | 267/141.1 |
| 3,581,681 | 6/1971 | Newton | 108/51 |
| 3,654,877 | 4/1972 | Barrett | 108/56 |
| 3,679,159 | 7/1972 | Bach et al. | 267/153 X |
| 3,806,180 | 4/1974 | Patterson | 293/133 |
| 3,892,902 | 7/1975 | Ilukowicz | 52/98 X |
| 3,930,665 | 1/1976 | Ikawa | 293/133 X |
| 4,098,525 | 7/1978 | Schwanz et al. | 188/377 X |
| 4,121,393 | 10/1978 | Renault et al. | 52/167 |
| 4,221,413 | 9/1980 | Bonnetain | 188/377 X |
| 4,227,593 | 10/1980 | Bricmont et al. | 188/377 |
| 4,336,868 | 6/1982 | Wilson et al. | 293/133 X |
| 4,492,291 | 1/1985 | Chometon et al. | 188/377 |

FOREIGN PATENT DOCUMENTS

| | | | |
|---|---|---|---|
| 1212989 | 10/1958 | France | 248/548 |
| 2405161 | 6/1979 | France | 293/133 |
| 955718 | 4/1964 | United Kingdom | 188/376 |
| 2024986 | 1/1980 | United Kingdom | 188/372 |

*Primary Examiner*—Douglas C. Butler
*Attorney, Agent, or Firm*—Jack L. Hummel; Rodney F. Brown

[57] ABSTRACT

A shock absorbing assembly having sections for controlling the modal deformation of collapse and capable of absorbing the dynamic energy of impact caused by the rapid deceleration of heavy masses is provided. The shock absorbing assembly has a plurality of arcuate steel sections sandwiched between steel plates with an elastomeric rubber compound secured to and covering at least one surface of one plate. Each of the arcuate steel sections are provided with a groove in its soffit.

31 Claims, 2 Drawing Sheets

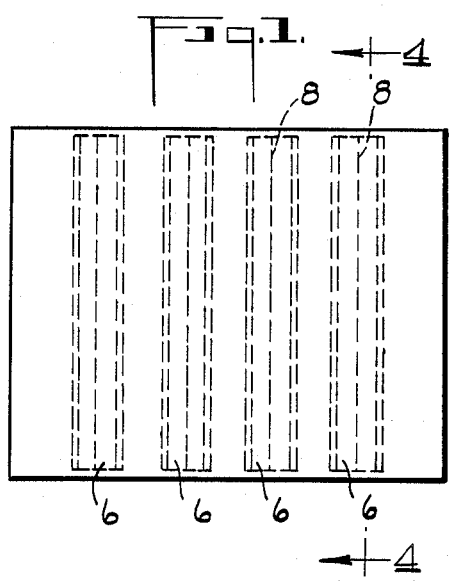
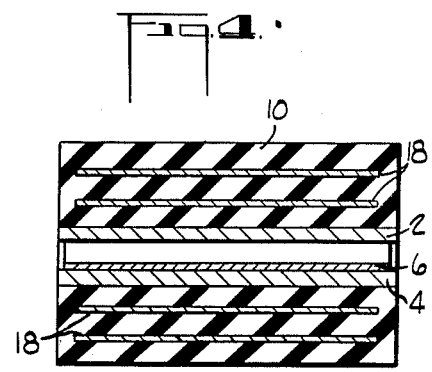
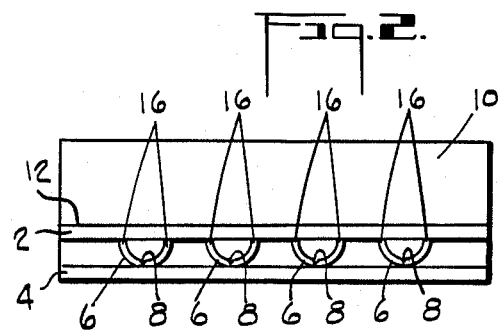
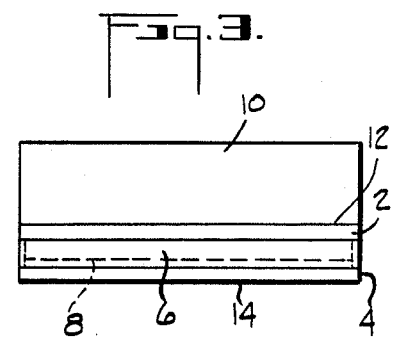

ASSEMBLY FOR AND A METHOD OF ABSORBING IMPACT SHOCK LOADS

FIELD OF THE INVENTION

This invention relates to a shock absorbing assembly having means for controlling the modal deformation of collapse and in particular to a shock absorbing assembly capable of absorbing the dynamic energy of impact caused by the rapid deceleration of heavy masses such as a generator being deposited on an offshore oil platform.

BACKGROUND OF THE INVENTION

A variety of differing shock absorbing assemblies have been disclosed in the past for a variety of differing objects. In Hanusa, U.S. Pat. No. 3,345,245, the shock absorbing assembly comprises a base formed from corrugated cardboard having a polyurethane shock absorbing material secured to and covering the corrugated surface. Steimen, U.S. Pat. No. 3,311,331, discloses a shock absorbing assembly wherein the shock absorbing material has means for securing the material to a leg of a machine and means for preventing the machine from creeping off the shock absorbing material. O'Donnell, U.S. Pat. No. 3,362,666, discloses a shock absorbing assembly for an office machine which can be positioned in various ways on the shock absorbing assembly. Nathan, U.S. Pat. No. 3,107,377, discloses shock absorbing assemblies constructed so that the upper surface can move relative to the lower surface to provide compensation for the expansion contraction of bridge members. While these references show a variety of shock absorbing assemblies, none of these references discloses a shock absorbing assembly having means for controlling the modal deformation of collapse.

It is an object of this invention to provide a shock absorbing assembly having means for controlling the modal deformation of collapse.

It is another object of this invention to provide a shock absorbing assembly having means for controlling the modal deformation of collapse and capable of absorbing the dynamic energy of impact generated by the rapid deceleration of heavy masses.

SUMMARY OF THE INVENTION

The foregoing objects are accomplished by the instant invention by providing a shock absorbing assembly having means for controlling the modal deformation of collapse. This is accomplished by a shock absorbing assembly comprising a plurality of sections, which are arcuate in cross section, sandwhiched between two steel plates wherein a groove is ground in the soffit of each section to provide for the modal deformation of collapse. An elastomeric rubber compound is secured to and covers the top plate and if desired may also be secured to and cover the bottom plate. The elastomeric rubber compound comprises a plurality of rubber slabs bonded together with metal plates between the slabs. The plates and with metal plates between the slabs. The plates and the sections are formed from steel to provide the ability to absorb the dynamic energy of impact caused by the rapid deceleration of heavy masses such as the large generators used at offshore oil platforms.

BRIEF DESCRIPTION OF THE DRAWINGS

The foregoing and other objects, features, and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

FIG. 1 is a top plan view of a shock absorbing assembly of this invention;
FIG. 2 is a side elevation of FIG. 1;
FIG. 3 is an end elevation of FIG. 1;
FIG. 4 is a cross section of a modification.

DETAILED DESCRIPTION OF THE PREFERRED EMBODIMENT

Figure 5:
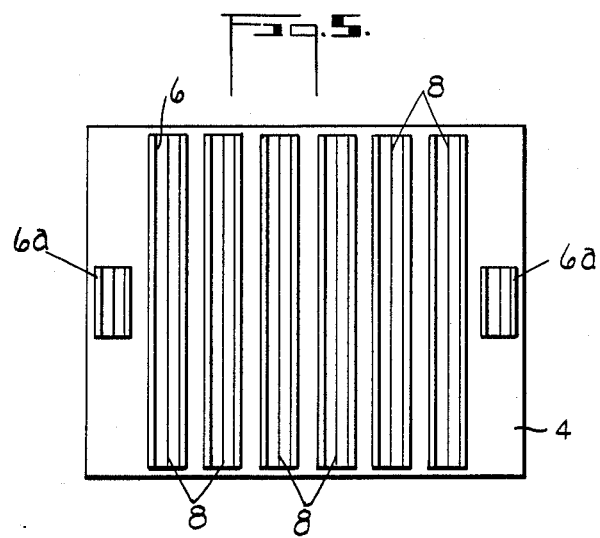
FIG. 5 is a top plan view with the top plate and elastomer removed.

The shock absorbing assembly of this invention is illustrated in the drawings and comprise a top plate 2 and a bottom plate 4. Sanwhiched between the top plate 2 and bottom plate 4 are a plurality of sections 6. As shown in FIG. 2, the sections 6 are arcuate in cross section and specifically are half round. As illustrated in FIG. 1, the sections 6 preferably extend across the short dimension of the plates. Although the plates 2 and 4 are illustrated as rectangles having a long and a short dimension, the plates 2 and 4 may be equilateral. A groove 8 is ground in the soffit of each section 6 to provide for the modal deformation of collapse. The groove 8 extends for substantially the complete length of each section and is located at the center of the soffit. The sections 6 are secured to the plates 2 and 4 by any suitable means such as by welding. An elastomeric rubber compound 10 is secured to and covers the top surface 12 of plate 2. If desired, an elastomeric rubber compound may be secured to and cover the bottom surface 14 of plate 4 as illustrated in FIG. 4.

The edges 16 of the sections 6 are welded to the top plate 2 with a full penetration weld along the entire length of each edge 16. The sections 6 are secured to the bottom plate 4 by tack welds preferably at the extreme ends of each section.

The elastomeric rubber compound 10 comprises a lamination comprising a plurality of rubber slabs bonded together with metal plates 18 bonded between some of the slabs. Any suitable means may be used for bonding the rubber slabs as long as they can withstand the horizontal shear forces occurred during installation.

In one embodiment of the invention, each plate has a length of about 610 mm, a width of about 406 mm and a thickness of about 13.4 mm. Each section comprises a half-round tubular section having a radius of about 30.15 mm, a wall thickness of about 3.2 mm and a length of about 396 mm. The groove 8 is ground into the soffit a distance of about 1.7 mm. The elastomeric rubber compound comprises a natural rubber having a Durometer of about 50, a minimum tensile strength of about 15.5 N/mm$^2$, an elongation at break of about 450 percent, a compression modulus of about 3.45 MN/m$^2 \pm 15$ percent and a shear modulus of about 0.81. Each steel plate imbedded in the elastomeric rubber compound has a length of about 573 mm, a width of about 363 mm and a thickness of about 6.7 mm. The total height of a shock absorbing assembly, illustrated in FIG. 1, is about 155 mm.

The shock absorbing assembly, illustrated in FIG. 1, is designed for a static weight distribution of about 68.7 tonnes, and dynamic weight distribution of about 100 tonnes for maximum capability continuous, i.e. >20 m sec. duration and about 116.7 tonnes for maximum short transients, i.e. <20 m sec. duration. The dynamic weight distributions are assessed from the following peak decelerations: Forces up plus about 1.75 g Absolute for maximum short transients from ≦20 m sec. to ≦5 m sec. and Forces up shall not exceed about 2.2 g Absolute for maximum short transients of ≦5 m sec. Limited velocity on impact is about 1 ft/sec.

In another embodiment of the invention FIG. 5, each plate has a length of about 610 mm, a width of about 406 mm and a thickness of about 13.4 mm. Six sections 6 each having a length of about 396 mm spaced apart equal distances are secured between the plates 2 and 4 and two sections 6a each having a length of about 85 mm are positioned adjacent each end and spaced therefrom a distance of about 35 mm. This embodiment is designed for a static weight distribution of about 131.6 tonnes, and a dynamic weight distribution of about 200 tonnes for maximum capability continuous, i.e. <20 m sec. duration and about 230.3 tonnes for maximum short transients, i.e. <20 m sec. duration. The dynamic weight distributions are assessed from the following peak decelerations: Forces up plus about 1.5 g Absolute for maximum capability continuous; Forces up plus about 1.75 g Absolute for maximum short transients from ≦20 m sec. to ≦5 m sec. and Forces up shall not exceed about 2.2 g Absolute for maximum short transients of ≦5 m sec. Limited velocity on impact is about 1 ft/sec.

Figure 6:
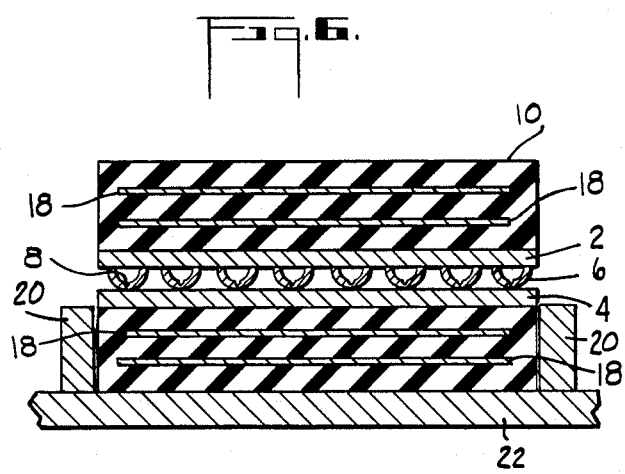
FIG. 6 is a cross section showing a shock absorbing assembly mounted on a surface.

The shock absorbing assemblies must be capable of absorbing the horizontal component of impact forces accruing from a 2.5° slinging angle of tilt of the heavy mass during installation. This may be accomplished by tack welding the bottom plate to the surface on which the shock absorbing assembly is mounted. As illustrated in FIG. 6, this may also be accomplished by guide frames 20 secured to the roof 22 of the substructure.

In operation, the initial impact and any slight surface imperfections are absorbed by the elastomeric rubber compound. As the load reaches a critical value, the steel tubes plastically deform and the shock absorbing assembly compresses at near constant load maximizing the energy absorbing relations to peak force. The shock absorbing assembly is designed to absorb a certain amount of energy at a given peak deceleration but in the event of catastrophic impact, some impact absorption will still be retained at loads in excess of three times the design limit.

Shock absorbing assemblies made in accordance with this invention were used successfully to land two generators, each having a sling mass of 265 tonnes. Two shock absorbing assemblies, each providing a static weight distribution of 66.7 tonnes were mounted at predetermined locations on the roof of a substructure and one shock absorbing assembly providing a static weight distribution of 131.6 tonnes was mounted at another predetermined location on the roof of a substructure. A crane was used to transfer the generator from a cargo ship to an offshore oil platform. During installation, contact was made on the two shock absorbing assemblies first and then on the one. The shock absorbing assemblies functioned as described above with the initial impact being absorbed by the elastomeric rubber compound and the steel tubes plastically deforming to absorb the heavy impact forces.

While the preferred embodiment of the invention has been illustrated and described herein, it may be otherwise embodied and practiced within the scope of the following claims.

What is claimed is:

1. A method for absorbing the impact of a rapidly decelerating heavy mass comprising:
   (a) mounting at least one shock absorbing assembly at a predetermined location;
   (b) depositing said heavy mass on said shock absorbing assembly with said heavy mass having a velocity component while being deposited;
   (c) decelerating said heavy mass;
   (d) absorbing the initial impact forces of said decelerating heavy mass by a resilient material; and
   (e) absorbing the critical impact forces of said decelerating heavy mass by plastic deformation.

2. A method as in claim 1 and further comprising:
   (a) controlling the modal of said plastic deformation to collapse.

3. A method as in claim 2 wherein:
   (a) said resilient material comprises an elastomeric rubber compound.

4. A method as in claim 3 wherein said controlling of the modal of said plastic deformation to collapse comprises:
   (a) forming a groove in the soffit of an arcuate metal section of a predetermined length; and
   (b) sandwiching a plurality of said metallic sections between a pair of metallic plates.

5. A method as in claim 4 wherein:
   (a) said velocity is about 1 ft/second.

6. A method as in claim 5 wherein:
   (a) mounting a plurality of shock absorbing assemblies at predetermined spaced locations.

7. A method as in claim 6 wherein:
   (a) said heavy mass is in excess of 200 tonnes.

8. A shock absorbing assembly comprising:
   (a) a top plate and a bottom plate, both plates having top and bottom surfaces;
   (b) a plurality of half-circular sections aligned between said top and bottom plates, each said section having an inner concave surface, an outer convex surface, two straight longitudinal edges in a plane substantially parallel to said plates and two endpoints, each in a plane substantially perpendicular to said plates;
   (c) a groove formed longitudinally and continuously in said concave surface having sufficient depth to provide for modal plastic deformation of collapse of said shock absorbing assembly; and
   (d) a guide member affixed to a substructure supporting said sections and plates, said guide member substantially abutting said bottom plate and capable of absorbing a horizontal force to said top plate.

9. The assembly of claim 8 wherein said longitudinal edges contact said bottom surface of said top plate and said outer convex surface contacts said top surface of said bottom plate.

10. The assembly of claim 8 wherein said top plate and bottom plate have a long dimension and a short dimension and said sections are aligned substantially parallel to said short dimension and of predetermined length which is less than but substantially equal to said short dimension.

11. The assembly of claim 8 wherein said guide member is a frame aligned substantially perpendicular to said bottom plate.

12. The assembly of claim 8 wherein said sections and plates are formed from steel.

13. A shock absorbing assembly comprising:
(a) a top plate and a bottom plate, both plates having top and bottom surfaces;
(b) a plurality of half-circular sections aligned between said top and bottom plates, each said section having an inner concave surface, an outer convex surface, two straight longitudinal edges in a plane substantially parallel to said plates and two endpoints, each in a plane substantially perpendicular to said plates;
(c) a groove formed longitudinally and continuously in said concave surface having sufficient depth to provide for modal plastic deformation of collapse of said shock absorbing assembly;
(d) a shock absorbing material secured to said bottom surface of said bottom plate and contacting a substructure supporting said sections and plates; and
(e) a guide member affixed to said substructure supporting said sections and plates, said guide member substantially abutting said shock absorbing material secured to said bottom plate and capable of absorbing a horizontal force to said top plate.

14. The assembly of claim 13 wherein said longitudinal edges contact said bottom surface of said top plate and said outer convex surface contacts said top surface of said bottom plate.

15. The assembly of claim 13 wherein said top plate and bottom plate have a long dimension and a short dimension and said sections are aligned substantially parallel to said short dimension and of predetermined length which is less than but substantially equal to said short dimension.

16. The assembly of claim 13 wehrein said sections and plates are formed from steel.

17. The assembly of claim 13 whrein said guide member is a frame aligned substantially perpendicular to said bottom plate.

18. The assembly of claim 13 wherein a shock-absorbing material is secured to and substantially covers said top surface of said top plate.

19. The assembly of claim 13 wherein said shock-absorbing material substantially covers said bottom surface of said bottom plate.

20. The assembly of claim 13 wherein said shock-absorbing material comprises an elastomeric rubber compound.

21. The assembly of claim 13 wherein said shock-absorbing material comprises a plurality of elastomeric rubber slabs bonded together and having a metal palte bonded between at least two of the slabs.

22. A shock absorbing assembly comprising:
(a) a top plate and a bottom plate, both plates having top and bottom surfaces;
(b) a plurality of half-circular sections aligned between said top and bottom plates, each said section having an inner concave surface, an outer convex surface, two straight longitudinal edges in a plane substantially parallel to said plates and two endpoints, each in a plane substantially perpendicular to said plates; and
(c) a groove formed longitudinally and continuously in said concave surface having sufficient depth to provide for modal plastic deformation of collapse of said shock absorbing assembly.

23. The assembly of claim 22 wherein said longitudinal edges contact said bottom surface of said top plate and said outer convex surface contacts said top surface of said bottom plate.

24. The assembly of claim 22 wherein said top plate and bottom plate have a long dimension and a short dimension and said sections are aligned substantially parallel to said short dimension and of predetermined length which is less than but substantially equal to said short dimension.

25. The assembly of claim 22 wherein said sections and plates are formed from steel.

26. The assembly of claim 22 further comprising a shock absorbing material secured to said bottom surface of said bottom plate.

27. The assembly of claim 22 further comprising a shock absorbing material secured to and substantially covering said top surface of said top plate.

28. The assembly of claim 26 wherein said shock absorbing material comprises an elastomeric rubber compound.

29. The assembly of claim 26 wherein said shock absorbing material comprises a plurality of elastomeric rubber slabs bonded together and having a metal plate bonded between at least two of the slabs.

30. The assembly of claim 27 wherein said shock absorbing material comprises an elastomeric rubber compound.

31. The assembly of claim 27 wherein said shock absorbing material comprises a plurality of elastomeric rubber slabs bonded together and having a metal plate bonded between at least two of the slabs.

* * * * *

UNITED STATES PATENT AND TRADEMARK OFFICE
CERTIFICATE OF CORRECTION

PATENT NO. : 4,830,347
DATED : May 16, 1989
INVENTOR(S) : Bernard Langshaw

It is certified that error appears in the above-identified patent and that said Letters Patent is hereby corrected as shown below:

| | |
|---|---|
| Col. 1, line 52: | Delete "sandwhiched" and insert --sandwiched--. |
| Col. 1, line 60: | Delete "The plates and with metal plates between the slabs.". |
| Col. 2, line 22: | Delete "sandwhiched" and insert --sandwiched--. |
| Col. 5, line 38: | Delete "wehrein" and insert --wherein--. |
| Col. 5, line 40: | Delete "whrein" and insert --wherein--. |
| Col. 6, line 3: | Delete "palte" and insert --plate--. |

Signed and Sealed this

Twenty-third Day of January, 1990

*Attest:*

JEFFREY M. SAMUELS

*Attesting Officer*   *Acting Commissioner of Patents and Trademarks*